United States Patent
Suzuki et al.

(10) Patent No.: US 11,380,482 B2
(45) Date of Patent: *Jul. 5, 2022

(54) DIELECTRIC COMPOSITION AND ELECTRONIC COMPONENT

(71) Applicant: TDK CORPORATION, Tokyo (JP)

(72) Inventors: Shota Suzuki, Tokyo (JP); Nobuyuki Okuzawa, Tokyo (JP); Daisuke Hirose, Tokyo (JP); Shirou Ootsuki, Tokyo (JP); Wakiko Sato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 103 days.

This patent is subject to a terminal disclaimer.

(21) Appl. No.: 17/042,523

(22) PCT Filed: Mar. 15, 2019

(86) PCT No.: PCT/JP2019/010904
§ 371 (c)(1),
(2) Date: Sep. 28, 2020

(87) PCT Pub. No.: WO2019/188435
PCT Pub. Date: Oct. 3, 2019

(65) Prior Publication Data
US 2021/0012961 A1 Jan. 14, 2021

(30) Foreign Application Priority Data

Mar. 28, 2018 (JP) .............. JP2018-062933

(51) Int. Cl.
*H01G 4/12* (2006.01)
*C04B 35/453* (2006.01)
(Continued)

(52) U.S. Cl.
CPC ............ *H01G 4/12* (2013.01); *C04B 35/453* (2013.01); *C04B 35/495* (2013.01); *H01B 3/12* (2013.01); *H01G 4/30* (2013.01); *H01G 4/33* (2013.01)

(58) Field of Classification Search
None
See application file for complete search history.

(56) References Cited

U.S. PATENT DOCUMENTS 5,449,652 A * 9/1995 Swartz ............... H01B 3/12
501/134
6,395,663 B1 * 5/2002 Chen ................ C04B 35/6303
501/134
(Continued)

FOREIGN PATENT DOCUMENTS

CN 1892934 A 1/2007
CN 105027240 A 11/2015
(Continued)

OTHER PUBLICATIONS

Wei Ren et al., "Bismuth zinc niobate pyrochlore dielectric thin films for capacitive applications", Journal of Applied Physics vol. 89, No. 1, pp. 767-774, (2001).
(Continued)

*Primary Examiner* — Dion R. Ferguson
(74) *Attorney, Agent, or Firm* — Oliff PLC (57) ABSTRACT

A dielectric composition including a complex oxide containing bismuth, zinc, and niobium, includes a crystal phase formed of the complex oxide and having a pyrochlore type crystal structure, and an amorphous phase. When the complex oxide is represented by a composition formula $Bi_xZn_yNb_zO_{1.75+\delta}$, in which x, y, and z satisfy relations of x+y+z=1.00, 0.20≤y≤0.50, and 2/3≤x/z≤3/2.

14 Claims, 2 Drawing Sheets

(51) Int. Cl.
    *C04B 35/495*     (2006.01)
    *H01B 3/12*     (2006.01)
    *H01G 4/30*     (2006.01)
    *H01G 4/33*     (2006.01)

(56) References Cited

U.S. PATENT DOCUMENTS

| | | | |
|---|---|---|---|
| 9,567,263 B2* | 2/2017 | Masaoka | C04B 35/495 |
| 2007/0004165 A1* | 1/2007 | Shin | H05K 1/162 |
| | | | 438/393 |
| 2009/0155624 A1 | 6/2009 | Dudesek et al. | |
| 2016/0016813 A1* | 1/2016 | Shimoda | C23C 18/1283 |
| | | | 264/293 |
| 2016/0115084 A1* | 4/2016 | Masaoka | H01B 3/10 |
| | | | 501/135 |
| 2016/0376198 A1* | 12/2016 | Masaoka | H01G 4/1254 |
| | | | 501/135 |
| 2016/0379732 A1* | 12/2016 | Masaoka | C23C 14/08 |
| | | | 106/286.2 |
| 2017/0162324 A1 | 6/2017 | Shimoda et al. | |
| 2020/0294687 A1* | 9/2020 | Suzuki | H01B 3/10 |
| 2020/0312557 A1* | 10/2020 | Shirokawa | H01G 4/1254 |
| 2020/0312558 A1* | 10/2020 | Oba | H01G 4/1254 |
| 2021/0012961 A1* | 1/2021 | Suzuki | C04B 35/6265 |

FOREIGN PATENT DOCUMENTS

| | | |
|---|---|---|
| JP | 2009-537444 A | 10/2009 |
| WO | 2016/013416 A1 | 1/2016 |

OTHER PUBLICATIONS

Sep. 29, 2020 International Preliminary Report on Patentability issued in International Patent Application No. PCT/JP2019/010904.

\* cited by examiner

DIELECTRIC COMPOSITION AND ELECTRONIC COMPONENT

BACKGROUND OF THE INVENTION

The present invention relates to a dielectric composition and an electronic component.

There is a high demand for higher performance of mobile communication devices represented by smartphones. For example, the number of frequency bands to be used is increasing for achieving high-speed large-capacity communication. The frequency bands to be used are high-frequency region (e.g., GHz bands). Among high-frequency components that function in such a high-frequency region (e.g., baluns, couplers, filters, duplexers combining filters, diplexers combining filters), there is one utilizing a dielectric material as a resonator. Such a dielectric material is demanded to have a small dielectric loss and selectively pass a specific frequency in the high-frequency region.

Also, as the mobile communication devices attained a higher performance, a number of electronic components mounted to one mobile communication device are increasing. Therefore, in order to maintain the size of the mobile communication device, it is also demanded to make the electronic component more compact. In order to make the high-frequency component using the dielectric material more compact, it is necessary to reduce an area of electrode, thus a high relative permittivity of the dielectric material is demanded in the high-frequency region in order to compensate a capacitance decrease.

Such mobile communication devices are exposed to temperature change due to usage environment, heat generation of parts used in the devices, etc. Meanwhile, capacitance of the dielectric material changes depending on temperature, and temperature dependency of capacitance, that is, temperature coefficient of capacitance thereby needs to be small within a predetermined temperature range in the dielectric material.

Therefore, a dielectric material applied to a high-frequency component used in the high-frequency region is required to have a small dielectric loss and a high relative permittivity in the high-frequency region, and a small temperature coefficient of capacitance. Since a reciprocal of the dielectric loss can be expressed as a quality factor Q value, in other words, a dielectric material having a high relative permittivity and a quality factor Q value in a high-frequency region, and a small temperature coefficient of capacitance in a predetermined temperature range is desired.

In the past, Bi—Zn—Nb—O based oxide has been known as a material having a high permittivity in a high-frequency region. For example, Patent Literature 1 discloses a sintered body formed of a mixture of a $Bi_3NbO_7$ phase and a $Bi_2(Zn_{2/3}Nb_{4/3})O_7$ phase. In addition, Patent Literature 2 discloses a dielectric thin film formed of a mixture of a first crystal phase having a pyrochlore type crystal structure and a second crystal phase having a β-BiNbO$_4$ type crystal structure. In addition, Non-Patent Literature 1 discloses a dielectric thin film represented by a composition formula $(Bi_{3x}Zn_{2-3x})(Zn_xNb_{2-x})O_7$, where x is 0.5 or 2/3.

Patent Literature 1: Japanese Patent Laid-Open No. 2009-537444

Patent Literature 2: International Publication No. WO 2016/013416

Non-Patent Literature 1: Wei Ren et al., "Bismuth zinc niobate pyrochlore dielectric thin films for capacitive applications", Journal of Applied Physics 89, 767 (2001)

BRIEF SUMMARY OF INVENTION

Patent Literature 1 discloses that, regarding a sintered body obtained by mixing a $Bi_3NbO_7$ phase and a $Bi_2(Zn_{2/3}Nb_{4/3})O_7$ phase at a ratio of 1:1, an absolute value of a temperature coefficient of a permittivity is 10 ppm or less, a relative permittivity is about 100, and a dielectric quality factor Q at 1 GHz is about 1000. However, a dielectric disclosed in Patent Literature 1 is a sintered body, and has a problem that in order to show these dielectric properties, the dielectric needs to be a sintered body having a sufficient volume, and has an excessively large size as a dielectric material applied to a high-frequency component used in a high-frequency region.

In addition, Patent Literature 2 discloses that, regarding a thin film formed of a mixture of a first crystal phase having a pyrochlore type crystal structure and a second crystal phase having a β-BiNbO$_4$ type crystal structure, an absolute value of a temperature coefficient of a permittivity is 60 ppm or less, and a relative permittivity at 1 Hz to 100 kHz is about 150. However, in Patent Literature 2, a Q value in a high-frequency region is not evaluated at all, and dielectric properties in the high-frequency region are not sufficient.

In addition, Non-Patent Literature 1 discloses that, regarding a thin film represented by a composition formula $(Bi_{1.5}Zn_{0.5})(Zn_{0.5}Nb_{1.5})O_7$ and a thin film represented by a composition formula $Bi_2(Z_{1/3}Nb_{2/3})_2O_7$, relative permittivity at 10 kHz are 150 or less and Q values are about 250. However, in Non-Patent Literature 1, the Q values in high-frequency region are not evaluated at all, and dielectric properties in the high-frequency region are not sufficient.

The present invention has been made in view of such circumstances, and aims to provide a dielectric composition having a high relative permittivity εr and a high quality factor Q value in a high-frequency region, and a small absolute value of a temperature coefficient of capacitance Tcc in a predetermined temperature range.

In order to achieve the above-mentioned object, aspects of the invention are:

[1] a dielectric composition including a complex oxide containing bismuth, zinc, and niobium, in which the dielectric composition includes a crystal phase formed of the complex oxide and having a pyrochlore type crystal structure, and an amorphous phase, and the complex oxide is represented by a composition formula $Bi_xZn_yNb_zO_{1.75+\delta}$, in which x, y, and z satisfy relations of x+y+z=1.00, 0.20≤y≤0.50, and 2/3≤x/z≤3/2.

[2] The dielectric composition according to [1], in which the amorphous phase has the same composition as the complex oxide.

[3] A dielectric composition including a complex oxide containing bismuth, zinc, and niobium, in which the complex oxide is represented by a composition formula $Bi_xZn_yNb_zO_{1.75+\delta}$, in which x, y, and z satisfy relations of x+y+z=1.00, 0.20≤y≤0.50, and 2/3≤x/z≤3/2, and in an X-ray diffraction chart of the dielectric composition obtained by an X-ray diffraction measurement using a Cu—Kα ray as an X-ray source, a half-value width of a diffraction peak of a (222) plane that appears in a range of a diffraction angle 2θ of 27° or more and 30° or less is 0.35° or more and 2.0° or less.

[4] The dielectric composition according to [3], in which the dielectric composition includes a crystal phase having a pyrochlore type crystal structure, and an amorphous phase.

[5] The dielectric composition according to any one of [1] to [4], in which y satisfies a relation of 0.30≤y≤0.50.

[6] The dielectric composition according to any one of [1] to [5], in which x and z satisfy a relation of $1.20 \leq x/z \leq 1.50$.

[7] The dielectric composition according to any one of [1] to [5], in which x and z satisfy a relation of $0.90 \leq x/z \leq 1.10$.

[8] An electronic component including a dielectric film containing the dielectric composition according to any one of [1] to [7].

[9] The electronic component according to [8], in which the dielectric film is a dielectric deposition film.

According to the present invention, it is possible to provide a dielectric composition having a high relative permittivity εr and a high quality factor Q value in a high-frequency region, and a small absolute value of a temperature coefficient of capacitance Tcc in a predetermined temperature range.

DETAILED DESCRIPTION OF THE INVENTION

Hereinafter, the present invention will be described in detail in the following order based on specific embodiments.

1. Thin film capacitor
1.1. Overall configuration of thin film capacitor
1.2. Dielectric film
   1.2.1. Dielectric composition
1.3. Substrate
1.4. Lower electrode
1.5. Upper electrode
2. Method for manufacturing thin film capacitor
3. Effects in present embodiment
4. Modification (1. Thin Film Capacitor)

First, as an electronic component according to the present embodiment, a thin film capacitor in which a dielectric layer is configured with a thin film-shaped dielectric film will be described.

(1.1. Overall Structure of Thin Film Capacitor)

Figure 1:
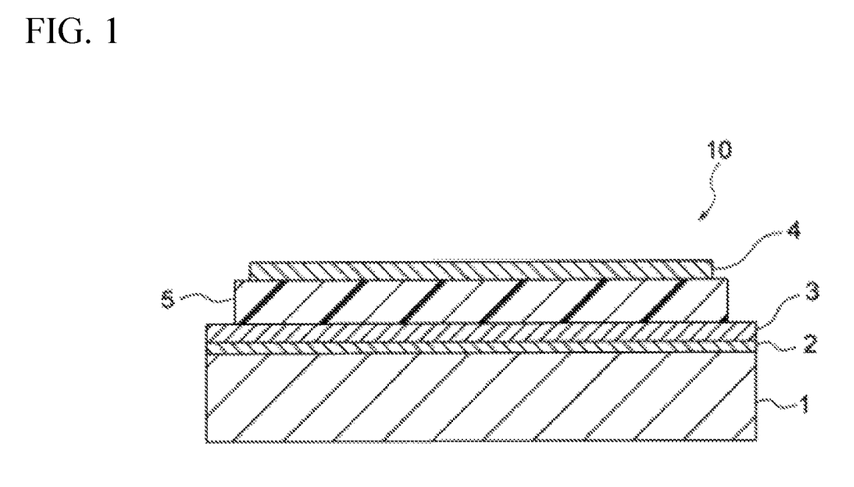
FIG. 1 is a schematic cross-sectional view of a thin film capacitor as an example of an electronic component according to an embodiment.

As shown in FIG. 1, a thin film capacitor 10 as an electronic component according to the present embodiment is structured by laminating a substrate 1, a lower electrode 3, a dielectric film 5, and an upper electrode 4 in this order. A capacitor part is formed from the lower electrode 3, the dielectric film 5, and the upper electrode 4. When the lower electrode 3 and the upper electrode 4 are connected to an external circuit and applied with voltage, the capacitor part exhibits a predetermined capacitance and can function as a capacitor. Each constituent is explained below in detail.

In the present embodiment, a foundation layer 2 is formed between the substrate 1 and the lower electrode 3 for improvement in adhesion between the substrate 1 and the lower electrode 3. The foundation layer 2 is composed of any material that can achieve a sufficient adhesion between the substrate 1 and the lower electrode 3. For example, the foundation layer 2 can be composed of Cr when the lower electrode 3 is composed of Cu, and the foundation layer 2 can be composed of Ti when the lower electrode 3 is composed of Pt.

The thin film capacitor 10 shown in FIG. 1 may be provided with a protection film for protecting the dielectric film 5 from the outside atmosphere.

Incidentally, the thin film capacitor may have any shape, but normally has a rectangular parallelepiped shape. The thin film capacitor may have any size and has appropriate thickness and length depending on the application.

(1.2. Dielectric Film)

The dielectric film 5 is constituted from the dielectric composition according to the present embodiment described in below. Also, in the present embodiment, the dielectric film 5 is not constituted from a sintered body obtained by sintering a green compact of a raw material powder of the dielectric composition but preferably the dielectric film 5 is a dielectric deposition film of a thin film made by a known film forming method.

A thin film capacitor including such a dielectric film 5 can exhibit a high relative permittivity εr (for example, 100 or more) and a high Q value (for example, 1000 or more) even in a high-frequency region (for example, 2 GHz), and can exhibit a good temperature coefficient of capacitance (for example, an absolute value of the temperature coefficient of capacitance is within 30 ppm/° C.).

Preferably, the dielectric film 5 has a thickness of 10 nm to 2000 nm (more preferably, 50 nm or more and 1000 nm or less). When the dielectric film 5 is too thin, insulation breakdown of the dielectric film 5 tends to easily occur. If insulation breakdown occurs, the capacitor part cannot function as a capacitor. On the other hand, when the dielectric film 5 is too thick, the electrode area needs to be large for increasing the capacitance of the capacitor, and it may be difficult to downsize the electronic component and reduce its height depending on the architecture of the electronic component.

It is known that a Q value normally tends to decrease as dielectrics become thinner. To obtain a high Q value, it is necessary to use dielectrics with a certain thickness, that is, bulk dielectrics. However, the dielectric film composed of the dielectric composition according to the present embodiment can obtain a high Q value even if it has an extremely small thickness as mentioned above.

Incidentally, the thickness of the dielectric film 5 can be measured by processing the thin film capacitor containing the dielectric film 5 with focused ion beam (FIB) processing equipment and observing the obtained cross section with scanning electron microscope (SEM).

(1.2.1. Dielectric Composition)

The dielectric composition according to the present embodiment contains a main component of a complex oxide (Bi—Zn—Nb—O based oxide) containing bismuth (Bi), zinc (Zn), and niobium (Nb). In the present embodiment, the main component is a component accounting for 90 mass % or more of 100 mass % of the dielectric composition.

In addition, the dielectric composition contains a crystal phase and an amorphous phase.

The crystal phase has a pyrochlore type crystal structure and is formed of the above-mentioned complex oxide represented by a general formula $A_2B_2O_7$. On the other hand, the amorphous phase is considered to have the same composition as the complex oxide constituting the crystal phase. That is, in the present embodiment, both the crystal phase and the amorphous phase are formed of the above-mentioned complex oxide.

This amorphous phase is a phase which does not reach a thermal equilibrium state, though atoms constituting the above-mentioned complex oxide are arranged so as to form the pyrochlore type crystal structure, and thus is a phase formed with an incomplete crystal having a short-range order similar to that of the pyrochlore type crystal structure but having an atomic arrangement without crystalline regularity.

This amorphous phase is not completely crystallized, and thus may take in elements discharged when the crystal phase is crystallized. In addition, this amorphous phase is not completely crystallized, and therefore is less susceptible to restrictions on crystal structure by ionic radius of constituent elements, etc., and a ratio of the constituent elements thereof may be shifted. Accordingly, it can be said that the amorphous phase and the crystal phase have the same composition in that both are formed with Bi—Zn—Nb—O based oxide, that is, both contain bismuth, zinc, niobium, and oxygen. However, the amorphous phase and the crystal phase may also have the same or slightly different ratios of constituent elements.

In other words, in the above-mentioned complex oxide (Bi—Zn—Nb—O based oxide), a region that has reached a thermal equilibrium state is the above-mentioned crystal phase, and a region that has not reached a thermal equilibrium state and thus has composition fluctuation is the above-mentioned amorphous phase.

The present inventors have found that the crystal phase of the above-mentioned complex oxide has a negative temperature coefficient of capacitance, and the amorphous phase of this complex oxide has a positive temperature coefficient of capacitance. Therefore, in the present embodiment, due to coexistence of the crystal phase and the amorphous phase in the complex oxide, the absolute value of the temperature coefficient of capacitance of the dielectric composition can be controlled within a predetermined range. In addition, with such a mixed phase structure, crystal grain boundaries are reduced, and as a result, leakages of current through the crystal grain boundaries are suppressed, so that the quality factor Q value can also be improved.

In addition, in the present embodiment, in an X-ray diffraction chart obtained by performing an X-ray diffraction measurement on the dielectric composition according to the present embodiment by using a Cu—Kα ray as an X-ray source, a half-value width of a diffraction peak of a (222) plane that appears in a range of a diffraction angle 2θ of 27° or more and 30° or less is 0.35 or more and 2.0 or less. Since the half-value width is within the above-mentioned range, the absolute value of the temperature coefficient of capacitance of the dielectric composition is controlled within the predetermined range, and the quality factor Q value is further improved. The half-value width is calculated as an extent (a width) of a peak at a half intensity of peak intensity.

In addition, the half-value width of the peak obtained by the X-ray diffraction has a correlation with a length of an order in a structure, the shorter the length of the order, the larger the half-value width, and the longer the length of the order, the smaller the half-value width. The dielectric composition having a half-value width of a peak of 0.35 or more and 2.0 or less preferably contains a crystal phase and an amorphous phase.

On the other hand, in the present embodiment, in the X-ray diffraction chart obtained by performing the X-ray diffraction measurement on the dielectric composition according to the present embodiment using the Cu—Kα ray as the X-ray source, when the half-value width of the peak that appears in the range of the 2θ of 27° or more and 30° or less is 0.35 or more and 2.0 or less, it may be judged that the dielectric composition has both a crystal phase and an amorphous phase. When the half-value width is less than 0.35, it is indicated that the length of the order is long, and therefore the dielectric composition is judged to be a crystal single phase, and when the half-value width is more than 2.0, it is indicated that the length of the order is short, and therefore the dielectric composition is judged to be an amorphous single phase.

As described above, the pyrochlore type crystal structure is represented by the general formula $A_2B_2O_7$. In the pyrochlore type crystal structure, an element occupying an A site (A-site element) is eight-coordinated by oxygen, and an element occupying a B site (B-site element) is six-coordinated by oxygen. $BO_6$ octahedrons in which a B-site element is located at a center of the octahedron formed with oxygen constitute a three-dimensional network in which vertices are shared with each other, A-site elements are located in interstices of this network, and each A-site element is located in a center of a hexahedron formed with oxygen.

In the present embodiment, the general formula $A_2B_2O_7$ may be represented by a composition formula $Bi_xZn_yNb_zO_{1.75+\delta}$. That is, the above-mentioned complex oxide constituting the crystal phase and the amorphous phase is represented by the composition formula $Bi_xZn_yNb_zO_{1.75+\delta}$. In this composition formula, "x", "y", and "z" satisfy x+y+z=1.00.

In addition, in this complex oxide, an oxygen (O) amount may be a stoichiometric ratio or may be slightly deviated from the stoichiometric ratio. The deviation amount from the stoichiometric ratio changes depending on types of replacing elements and replacement amounts thereof, and is represented by "δ" in the above-mentioned composition formula.

Therefore, "x" indicates a content proportion of Bi among the metal elements in the composition formula of the above-mentioned complex oxide (crystal phase and amorphous phase), "y" indicates a content proportion of Zn among the metal elements in the composition formula of the above-mentioned complex oxide, and "z" indicates a content proportion of Nb among the metal elements in the composition formula of the above-mentioned complex oxide.

In the above-mentioned general formula, Bi occupies the A site and Nb occupies the B site. On the other hand, in the above-mentioned general formula, Zn may occupy both the A site and the B site. Therefore, in the pyrochlore type crystal structure of the crystal phase formed with the above-mentioned complex oxide (Bi—Zn—Nb—O based oxide), and a structure similar to the pyrochlore type crystal structure of the amorphous phase formed with the above-mentioned complex oxide (Bi—Zn—Nb—O based oxide), in addition to the hexahedron in which Bi is eight-coordinated by oxygen and the octahedron in which Nb is six-coordinated by oxygen, a hexahedron in which Zn is eight-coordinated by oxygen and an octahedron in which Zn is six-coordinated by oxygen are present.

In the complex oxide containing Bi, Zn, and Nb, a proportion of polyhedra in which Zn is coordinated by oxygen affects a stability of the pyrochlore type crystal structure and similar structure thereof. Therefore, in the present embodiment, "y" indicating the content proportion of Zn is controlled to be 0.20 or more and 0.50 or less. In addition, "y" is preferably 0.30 or more.

By setting "y" within the above-mentioned range, in the complex oxide (crystal phase and amorphous phase), a proportion of the hexahedron in which Zn is coordinated by oxygen and the octahedron in which Zn is coordinated by oxygen is increased, a variation of the polyhedral structure in the complex oxide is suppressed, and structural changes due to the temperature change hardly occur. As a result, the capacitance tends to be kept constant even if the temperature changes, so that the absolute value of the temperature coefficient of capacitance Tcc (|Tcc|) can be set within the predetermined range.

If "y" is too small, in the complex oxide (crystal phase and amorphous phase), the proportion occupied by the hexahedron in which Bi is coordinated by oxygen and the octahedron in which Nb is coordinated by oxygen increases, the variation of the polyhedral structure becomes large, and the structure tends to change, so that the temperature coefficient of capacitance Tcc tends to deteriorate. On the other hand, if "y" is too large, the proportion of polyhedra in which Zn is coordinated by oxygen becomes too large, and components that contribute to the relative permittivity in the complex oxide decrease, so that the relative permittivity εr tends to deteriorate.

In addition, in the present embodiment, "x/z" indicating the content proportion of Bi ("x") with respect to the content proportion of Nb ("z") is 2/3 or more and 3/2 or less. By setting "x/z" within the above-mentioned range, the content proportion of Bi and the content proportion of Nb are relatively close to each other, and therefore defects in the complex oxide (crystal phase and amorphous phase) are reduced, and the quality factor Q value can be improved.

"x/z" is preferably 1.20 or more and 1.50 or less. By setting "x/z" within the above-mentioned range, disarrangement (disorder) of atomic arrangement occurs in an appropriate range at the A site of the complex oxide (crystal phase and amorphous phase), and therefore it is possible to further improve the relative permittivity εr due to this disorder while maintaining a favorable quality factor Q value. If "x/z" is too large, the disorder becomes too large, and conversely, the quality factor Q value tends to decrease.

In addition, "x/z" is preferably 0.90 or more and 1.10. By setting "x/z" within the above-mentioned range, the content proportion of Bi and the content proportion of Nb are substantially the same, and therefore the defects in the complex oxide (crystal phase and amorphous phase) are further reduced, and the quality factor Q value can be further improved.

In the above-mentioned composition formula, by setting "x", "y", and "z" within the above-mentioned ranges, the relative permittivity εr, the quality factor Q value, and the temperature coefficient of capacitance Tcc can be improved.

Incidentally, the dielectric compositions according to the present embodiment may contain trace impurities, subcomponents, etc. as long as the effect of the present invention is demonstrated. For example, these elements are Mn, Ca, Ba, etc.

(1.3. Substrate)

The substrate 1 shown in FIG. 1 may be composed of any material with enough mechanical strength to support the foundation layer 2, the lower electrode 3, the dielectric film 5, and the upper electrode 4 formed on the substrate 1. For example, the substrate 1 is: a single crystal substrate composed of Si single crystal, SiGe single crystal, GaAs single crystal, InP single crystal, SrTiO$_3$ single crystal, MgO single crystal, LaAlO$_3$ single crystal, ZrO$_2$ single crystal, MgAl$_2$O$_4$ single crystal, or NdGaO$_3$ single crystal; a ceramic polycrystalline substrate composed of Al$_2$O$_3$ polycrystal, ZnO polycrystal, or SiO$_2$ polycrystal; or a metal substrate composed of metals (e.g., Ni, Cu, Ti, W, Mo, Al, Pt), their alloys, etc. In view of low cost, workability, etc., the substrate of the present embodiment is composed of Si single crystal.

For example, the substrate 1 has a thickness of 10 μm to 5000 μm. When the substrate 1 is too thin, it may be impossible to enhance the mechanical strength. When the substrate 1 is too thick, it may be impossible to contribute to downsizing of the electronic component.

The resistivity of the substrate 1 changes depending on the material of the substrate. When the substrate is composed of a material having a low resistivity, electric current may leak to the substrate during operation of the thin film capacitor and affect electrical characteristics of the thin film capacitor. Thus, when the substrate 1 has a low resistivity, the surface of the substrate 1 is preferably subjected to insulation treatment so as to prevent the inflow of electric current to the substrate 1 during operation.

For example, when the substrate 1 is composed of Si single crystal, an insulation layer is preferably formed on the surface of the substrate 1. As long as the substrate 1 and the capacitor part are insulated sufficiently, there is no limit to the material constituting the insulation layer or the thickness of the insulation layer. In the present embodiment, the material constituting the insulation layer is SiO$_2$, Al$_2$O$_3$, Si$_3$N$_x$, etc. Preferably, the insulation layer has a thickness of 0.01 μm or more.

(1.4. Lower Electrode)

As shown in FIG. 1, the lower electrode 3 is formed as a thin film via the foundation layer 2 on the substrate 1. The lower electrode 3 is an electrode for sandwiching the dielectric film 5 with the upper electrode 4 mentioned below and functioning as a capacitor. The lower electrode 3 is composed of any conductive material, such as metals of Pt, Ru, Rh, Pd, Ir, Au, Ag, Cu, etc., their alloys, and conductive oxides.

The lower electrode 3 has any thickness as long as it functions as an electrode. In the present embodiment, the lower electrode 3 preferably has a thickness of 0.01 μm or more.

(1.5. Upper Electrode)

As shown in figure, the upper electrode 4 is formed as a thin film on the surface of the dielectric film 5. The upper electrode 4 is an electrode for sandwiching the dielectric film 5 with the lower electrode 3 mentioned above and functioning as a capacitor. Thus, the polarity of the upper electrode 4 is different from that of the lower electrode 3.

As with the lower electrode 3, the upper electrode 4 is composed of any conductive material, such as metals (e.g., Pt, Ru, Rh, Pd, Ir, Au, Ag, Cu), their alloys, and conductive oxides.

(2. Method of Manufacturing Thin Film Capacitor)

Next, explained below is a method of manufacturing the thin film capacitor 10 shown in figure.

The substrate 1 is initially prepared. When the substrate 1 is a Si single crystal substrate, an insulation layer is formed on a main surface of the substrate. The insulation layer is formed by a known film formation method, such as thermal oxidation method and chemical vapor deposition (CVD).

Then, the foundation layer 2 is formed by forming a thin film of a material constituting the foundation layer on the formed insulation layer by a known film formation method.

After the foundation layer 2 is formed, the lower electrode 3 is formed by forming a thin film of a material constituting the lower electrode by a known film formation method.

After the lower electrode 3 is formed, a heat treatment may be carried out in order to improve adhesiveness between the foundation layer 2 and the lower electrode 3 and also to improve a stability of the lower electrode 3. As a heat treatment condition, for example a temperature rising rate is preferably 10° C./min to 2000° C./min and more preferably 100° C./min to 1000° C./min. A holding temperature during the heat treatment is preferably 400° C. to 800° C. and a holding time is preferably 0.1 hour to 4.0 hours. When the heat treatment condition is out of the above-mentioned range, the foundation layer 2 and the lower electrode 3 may not adhere sufficiently and also the surface of the lower electrode 3 easily becomes rough, As a result, the dielectric properties of the dielectric film 5 tend to easily decrease.

Then, the dielectric film 5 is formed on the lower electrode 3. In the present embodiment, the dielectric film 5 is formed as a deposited film where a material constituting the dielectric film 5 is deposited as a thin film on the lower electrode 3 by a known film formation method.

For example, the known film formation method is vacuum deposition, sputtering, pulsed laser deposition (PLD), metal organic chemical vapor deposition (MO-CVD), metal organic decomposition (MOD), sol-gel process, chemical solution deposition (CSD), or the like. Incidentally, the raw materials used for the film formation (vacuum deposition materials, various target materials, organic metal materials, etc.) may contain trace impurities, sub-components, etc., but there is no problem as long as predetermined dielectric characteristics are obtained.

For example, when PLD method is used, the dielectric thin film 5 is formed on the lower electrode 3 using a target having a desired composition. In the present embodiment, the film formation conditions are preferably as follows. Preferably, oxygen pressure is 0.1-10 Pa. Preferably, the film formation is carried out at room temperature. Preferably, laser power is 3-5 J/cm$^2$. Preferably, pulse frequency is 1-20 Hz.

In the present embodiment, the dielectric film is formed and thereafter subjected to rapid thermal anneal (RTA). By controlling conditions under which RTA is applied, a mixed phase of a crystal phase and an amorphous phase can be easily obtained as a constituent phase of the complex oxide that constitutes the dielectric film. In addition, a dielectric composition having a half-value width within the above-mentioned range can be easily obtained. In the present embodiment, RTA is preferably carried out in oxygen atmosphere at a heating rate of 1000° C./min or more for 1-30 minutes at a temperature of 300° C. or more and 750° C. or less. If the annealing temperature is too low, the constituent phase of the complex oxide tends to be an amorphous single phase, and if the annealing temperature is too high, the constituent phase of the complex oxide tends to be a crystal single phase.

Next, the upper electrode 4 is formed on the formed dielectric film 5 by forming a thin film of a material constituting the upper electrode using a known film formation method.

Through the above steps, obtained is a thin film capacitor 10 where the capacitor part (the lower electrode 3, the dielectric film 5, and the upper electrode 4) is formed on the substrate 1 as shown in FIG. 1. Incidentally, the protection film for protecting the dielectric film 5 is formed by a known film formation method so as to cover at least a portion where the dielectric film 5 is exposed to the outside.

(3. Effects in Present Embodiment)

In the present embodiment, attention is paid to a Bi—Zn—Nb—O based oxide as a complex oxide having a pyrochlore type crystal structure. The present inventors have found that good properties can be obtained when the half-value width of the predetermined peak is within the predetermined range in the X-ray diffraction chart for the dielectric composition containing the complex oxide. The present inventors also have found that the crystal phase of the complex oxide has a negative temperature coefficient of capacitance, and the amorphous phase of the complex oxide has a positive temperature coefficient of capacitance.

In addition, in this complex oxide, Zn can occupy both the A site and the B site and form two types of polyhedra. The present inventors have found that by increasing the proportion of these two types of polyhedra, pyrochlore type crystal structure is stabilized, and structural changes due to temperature changes are less likely to occur.

Therefore, in the present embodiment, the temperature coefficient of capacitance Tcc is improved by making the crystal phase and the amorphous phase of the complex oxide coexist and setting the content proportion of Zn in the complex oxide within the above-mentioned range.

In addition, the present inventors have found that by making the content proportion of Bi occupying the A site and the content proportion of Nb occupying the B site relatively close to each other, defects of the complex oxide constituting the crystal phase and the amorphous phase can be reduced, and as a result, the quality factor Q value is improved. Furthermore, the present inventors have found that by making the crystal phase and the amorphous phase coexist, the crystal grain boundaries are reduced and the leak current is suppressed, whereby the quality factor Q value can be further improved. Therefore, in the present embodiment, a high quality factor Q value is obtained by setting the ratio of the content proportion of Bi and the content proportion of Nb within the above-mentioned ranges.

Specifically, the dielectric composition according to the present embodiment has a high relative permittivity εr of 100 or more and a high quality factor Q value of 1000 or more in a high-frequency region of 2 GHz or higher even when formed as a thin film-shaped dielectric film, and the absolute value of the temperature coefficient of capacitance Tcc can be set to 30 ppm/° C. or less.

Furthermore, by changing the value of x/z, a dielectric composition for which obtaining a high relative permittivity εr is emphasized, and a dielectric composition for which obtaining a high quality factor Q value is emphasized, can be obtained depending on the usage thereof.

(4. Modification)

The above embodiment was described based on the case in which the dielectric film is constituted only by the dielectric composition of the present invention but the dielectric film may be a multilayer structure combined with a film of other dielectric composition. For example, by forming a multilayer structure with an amorphous dielectric film or crystal film of known $Si_3N_x$, $SiO_x$, $Al_2O_x$, $ZrO_x$, $Ta_2O_x$, and the like, changes in impedance and relative permittivity of the dielectric film 5 caused by a temperature change can be regulated.

In the above-mentioned embodiment, the foundation layer is formed for improvement in the adhesion between the substrate and the lower electrode. However, no foundation layer may be formed if the adhesion between the substrate and the lower electrode can sufficiently be maintained. When the substrate is composed of metals that can be used as electrodes (e.g., Cu, Pt), their alloys, oxide conductive materials, or the like, neither foundation layer nor lower electrode may be formed.

Hereinbefore, an embodiment of the present invention is explained, but the present invention is not limited to the above-mentioned embodiment and may variously be changed within the scope of the present invention.

EXAMPLES

Hereinafter, the present invention is explained in further detail with examples and comparative examples, but the present invention is not limited to the following examples.

Experimental Example 1

First, a target required for forming a dielectric film was prepared as follows.

As raw material powders for manufacturing the target, powders of $Bi_2O_3$, ZnO, and $Nb_2O_5$ were prepared. These powders were weighed so as to have the final compositions of the samples of Examples 1 to 10 and Comparative Examples 1 to 9 shown in Table 1. The weighed raw material powders, water, and $ZrO_2$ beads ($\varphi$2 mm) were put into a polypropylene wide-mouth pot (volume: 1 L) and mixed in wet manner for 20 hours. After that, the mixed powder slurry was dried at 100° C. for 20 hours, and the obtained mixed powder was put into an $Al_2O_3$ crucible and calcined with firing conditions (five-hour holding at 800° C. in the air). Then, a calcined powder was obtained.

The obtained calcined powder was put into a mortar, and a polyvinyl alcohol (PVA) aqueous solution (concentration: 6 wt %) was added as a binder so that the solution would be 4 wt % to the calcined powder. Then, a granulated powder was prepared using a pestle. This prepared granulated powder was put into a die ($\varphi$20 mm) so as to have a thickness of about 5 mm and pressed using a uniaxial press machine to obtain a green compact. As the press conditions, the pressure was $2.0 \times 10^8$ Pa, and the temperature was room temperature.

Then, the obtained green compact was debindered at 100° C./hour (heating rate) and 400° C. (holding temperature) for four hours (temperature holding time) in the atmospheric pressure. The debindered green compact was subsequently fired at 200° C./hour (heating rate) and 1000° C.-1200° C. (holding temperature) for 12 hours (temperature holding time) in the atmospheric pressure. Then, a sintered body was obtained.

Both surfaces of the obtained sintered body were polished by a cylindrical grinding machine so that the thickness would be 4 mm. Then, a target for forming the dielectric film was obtained.

Next, a square substrate of 10 mm×10 mm having a $SiO_2$ insulation layer with a thickness of 6 μm on a surface of the Si single crystal substrate with a thickness of 350 μm was prepared. To the surface of this substrate, a Ti thin film having a thickness of 20 nm as a foundation layer was formed by a sputtering method.

Then, a Pt thin film (lower electrode) was formed by sputtering on the Ti thin film so that the thickness of the Pt thin film would be 4 μm.

To the formed Ti/Pt thin film (the foundation layer and the lower electrode), a heat treatment was performed in a temperature rising rate of 400° C./min at a holding temperature of 700° C. for a temperature holding time of 0.5 hour under oxygen atmosphere.

A dielectric film was formed on the Ti and Pt thin films. In the present examples, the dielectric film was formed on the lower electrode by PLD method using the above-prepared target so that the thickness of the dielectric film would be 400 nm. As the film formation conditions by PLD method, the oxygen pressure was 1 Pa, the laser power was 3 J/cm², the laser pulse frequency was 10 Hz, and the film formation temperature was room temperature. To partially expose the lower electrode, a metal mask was used for forming a region where the dielectric film was not formed. After the dielectric film was formed, the dielectric film was subjected to a rapid thermal annealing (RTA) where temperature was increased at 1000° C./min (heating rate) and held at a temperature shown in Table 1 for one minute in oxygen atmosphere.

Next, an Ag thin film (upper electrode) was formed on the obtained dielectric film using a vapor deposition device. The upper electrode was formed so that the diameter would be 100 μm and the thickness would be 100 nm using a metal mask. Then, obtained were samples of thin film capacitors having the structure shown in figure (Examples 1-29 and Comparative Examples 1-6).

Incidentally, the composition of the dielectric film of all samples was analyzed at room temperature using a wavelength dispersive X-ray fluorescence (WD-XRF) elemental analyzer (ZSX-100e manufactured by Rigaku Corporation) and was confirmed to have the composition described in Table 1. The thickness of the dielectric film was a value measured by processing the thin film capacitor with FIB and observing the obtained cross section with scanning electron microscope (SEM).

All of the obtained thin film capacitor samples were measured for relative permittivity εr, Q value and temperature coefficient of capacitance Tcc in the following manner. In addition, constituent phases of the dielectric composition constituting the dielectric film were identified by the method shown below.

(Relative Permittivity and Q Value)

The relative permittivity and the Q value were calculated for each thin film capacitor sample at a reference temperature of 25° C. by an RF Impedance/Material Analyzer (4991A manufactured by Agilent) from a capacitance measured under conditions of a frequency of 2 GHz and an input signal level (measurement voltage) of 0.5 Vrms, and a thickness of the dielectric film obtained as described above. In the present examples, it was judged that a higher relative permittivity is preferable, and a sample having a relative permittivity of 100 or more is good. In addition, it was judged that a higher Q value is preferable, and a sample having a Q value of 1000 or more is good. The results are shown in Table 1.

(Temperature Coefficient of Capacitance (Tcc))

Except for measuring the capacitance by changing a measurement temperature every 25° C. from −55° C. to 125° C. by using a constant temperature bath, the temperature coefficient of capacitance was calculated as a rate of change with respect to a capacitance at 25° C. that is the reference temperature by measuring the capacitance at the measurement temperature in the same manner as described above (unit: ppm/° C.). In addition, it was judged that a smaller temperature coefficient of capacitance is preferable, and a sample having an absolute value of the temperature coefficient of capacitance (|Tcc|) of 30 ppm/° C. or less is good. The results are shown in Table 1.

(Identification of Constituent Phases)

The identification of the constituent phases was performed by performing X-ray diffraction on the dielectric thin film, and calculating, in an X-ray diffraction chart, a half-value width of a diffraction peak of a (222) plane that appears in a range of a diffraction angle 2θ of 27° or more and 30° or less. Regarding the X-ray diffraction, a Cu—Kα ray was used as an X-ray source, and measurement conditions were a voltage of 45 kV, a current of 200 mA, and a scanning speed of 20 deg/min. In the present example, it was judged that the dielectric composition has a crystal single phase when the half-value width is less than 0.35°, it was judged that the dielectric composition has a mixed phase of a crystal phase and an amorphous phase when the half-value width is 0.35° or more and 2.0° or less, and it was judged that the dielectric composition has an amorphous single phase when the half-value width is more than 2.0°. The results are shown in Table 1.

Figure 2:
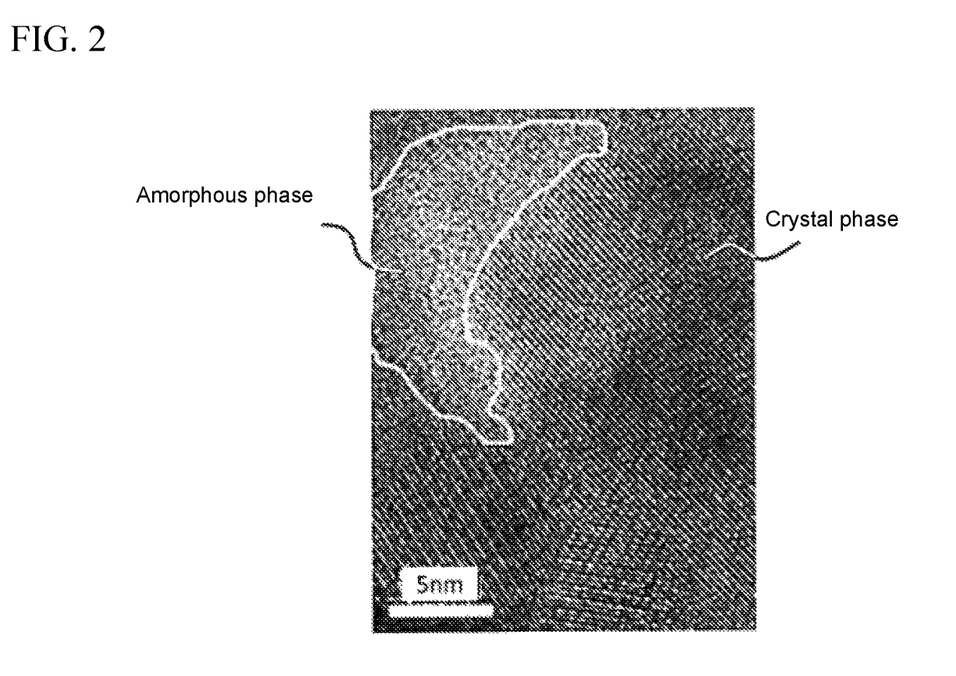
FIG. 2 is a TEM observation image of a sample according to an example of the present invention.

In addition, TEM observation was performed on the sample of Example 4. A TEM image of the obtained complex oxide is shown in FIG. 2. In FIG. 2, a region surrounded by a white line is the amorphous phase. In FIG. 2, the white line indicating the amorphous phase is a line added to clearly show the amorphous phase, and does not mean that a boundary between the amorphous phase and a crystal phase appears as the white line in the TEM image.

TABLE 1

| | Composition $Bi_xZn_yNb_zO_{1.75+\delta}$ | | | | RTA temperature (°C.) | Phase | | Electrical characteristics | | |
|---|---|---|---|---|---|---|---|---|---|---|
| | x | y | z | x/z | | Constituent phase | Half-value width | εr at 2 GHz | Q at 2 GHz | Tcc (ppm/°C.) |
| Comparative Example 1 | 0.33 | 0.19 | 0.48 | 0.70 | 550 | Crystal phase + Amorphous phase | 0.54 | 160 | 1240 | −200 |
| Comparative Example 2 | 0.20 | 0.51 | 0.29 | 0.70 | 550 | Crystal phase + Amorphous phase | 0.53 | 80 | 1400 | −4 |
| Comparative Example 3 | 0.28 | 0.25 | 0.47 | 0.60 | 550 | Crystal phase + Amorphous phase | 0.55 | 95 | 470 | −20 |
| Comparative Example 4 | 0.46 | 0.25 | 0.29 | 1.60 | 550 | Crystal phase + Amorphous phase | 0.56 | 136 | 550 | −26 |
| Comparative Example 5 | 0.31 | 0.25 | 0.44 | 0.70 | 620 | Crystal phase | 0.30 | 150 | 340 | −150 |
| Comparative Example 6 | 0.31 | 0.25 | 0.44 | 0.70 | 270 | Amorphous phase | 2.10 | 50 | 500 | 200 |
| Example 1 | 0.33 | 0.20 | 0.47 | 0.70 | 550 | Crystal phase + Amorphous phase | 0.54 | 115 | 1200 | −30 |
| Example 2 | 0.21 | 0.50 | 0.29 | 0.70 | 550 | Crystal phase + Amorphous phase | 0.56 | 100 | 1130 | −5 |
| Example 3 | 0.30 | 0.25 | 0.45 | 0.67 | 550 | Crystal phase + Amorphous phase | 0.53 | 105 | 1000 | −25 |
| Example 4 | 0.31 | 0.25 | 0.44 | 0.70 | 550 | Crystal phase + Amorphous phase | 0.54 | 117 | 1200 | −20 |
| Example 5 | 0.45 | 0.25 | 0.30 | 1.50 | 550 | Crystal phase + Amorphous phase | 0.54 | 125 | 1320 | −24 |
| Example 6 | 0.32 | 0.20 | 0.48 | 0.67 | 550 | Crystal phase + Amorphous phase | 0.55 | 110 | 1250 | −16 |
| Example 7 | 0.48 | 0.20 | 0.32 | 1.50 | 550 | Crystal phase + Amorphous phase | 0.54 | 115 | 1200 | −29 |
| Example 8 | 0.20 | 0.50 | 0.30 | 0.67 | 550 | Crystal phase + Amorphous phase | 0.55 | 100 | 1400 | −17 |
| Example 9 | 0.30 | 0.50 | 0.20 | 1.50 | 550 | Crystal phase + Amorphous phase | 0.55 | 118 | 1300 | −25 |
| Example 10 | 0.29 | 0.29 | 0.42 | 0.70 | 550 | Crystal phase + Amorphous phase | 0.55 | 118 | 1100 | −19 |
| Example 11 | 0.29 | 0.30 | 0.41 | 0.70 | 550 | Crystal phase + Amorphous phase | 0.55 | 112 | 1150 | −14 |
| Example 12 | 0.25 | 0.40 | 0.35 | 0.70 | 550 | Crystal phase + Amorphous phase | 0.55 | 111 | 1320 | −10 |
| Example 13 | 0.44 | 0.25 | 0.31 | 1.40 | 550 | Crystal phase + Amorphous phase | 0.52 | 130 | 1240 | −20 |
| Example 14 | 0.38 | 0.25 | 0.37 | 1.05 | 550 | Crystal phase + Amorphous phase | 0.59 | 116 | 1550 | −28 |
| Example 15 | 0.41 | 0.25 | 0.34 | 1.20 | 550 | Crystal phase + Amorphous phase | 0.61 | 120 | 1430 | −26 |
| Example 16 | 0.33 | 0.25 | 0.42 | 0.80 | 550 | Crystal phase + Amorphous phase | 0.54 | 108 | 1200 | −27 |
| Example 17 | 0.36 | 0.25 | 0.39 | 0.90 | 550 | Crystal phase + Amorphous phase | 0.53 | 114 | 1500 | −23 |
| Example 18 | 0.39 | 0.25 | 0.36 | 1.10 | 550 | Crystal phase + Amorphous phase | 0.58 | 111 | 1550 | −20 |
| Example 19 | 0.40 | 0.25 | 0.35 | 1.15 | 550 | Crystal phase + Amorphous phase | 0.54 | 112 | 1300 | −29 |
| Example 20 | 0.38 | 0.25 | 0.38 | 1.00 | 550 | Crystal phase + Amorphous phase | 0.54 | 102 | 1520 | −23 |
| Example 21 | 0.35 | 0.40 | 0.25 | 1.40 | 550 | Crystal phase + Amorphous phase | 0.56 | 130 | 1150 | −9 |
| Example 22 | 0.30 | 0.40 | 0.30 | 1.00 | 550 | Crystal phase + Amorphous phase | 0.53 | 112 | 1600 | −14 |
| Example 23 | 0.31 | 0.40 | 0.29 | 1.05 | 550 | Crystal phase + Amorphous phase | 0.53 | 115 | 1600 | −11 |
| Example 24 | 0.31 | 0.25 | 0.44 | 0.70 | 520 | Crystal phase + Amorphous phase | 0.36 | 105 | 1100 | −25 |
| Example 25 | 0.31 | 0.25 | 0.44 | 0.70 | 360 | Crystal phase + Amorphous phase | 1.90 | 102 | 1050 | 18 |
| Example 26 | 0.31 | 0.25 | 0.44 | 0.70 | 600 | Crystal phase + Amorphous phase | 0.35 | 119 | 1100 | −24 |
| Example 27 | 0.31 | 0.25 | 0.44 | 0.70 | 330 | Crystal phase + Amorphous phase | 2.00 | 104 | 1050 | 16 |

TABLE 1-continued

| | Composition | | | | RTA temperature (° C.) | Phase | | Electrical characteristics | | |
|---|---|---|---|---|---|---|---|---|---|---|
| | $Bi_xZn_yNb_zO_{1.75+\delta}$ | | | | | | Half-value width | εr at 2 GHz | Q at 2 GHz | Tcc (ppm/° C.) |
| | x | y | z | x/z | | Constituent phase | | | | |
| Example 28 | 0.29 | 0.29 | 0.42 | 0.70 | 600 | Crystal phase + Amorphous phase | 0.35 | 113 | 1200 | −16 |
| Example 29 | 0.29 | 0.29 | 0.42 | 0.70 | 330 | Crystal phase + Amorphous phase | 2.00 | 102 | 1150 | 25 |

From Table 1, it was confirmed that in the complex oxide containing Bi, Zn, and Nb, the sample of the mixed phase of the crystal phase having the relations of "x", "y", and "z" within the above-mentioned ranges and having the pyrochlore type crystal structure, and the amorphous phase having a similar structure, had a high relative permittivity εr (100 or more), a high quality factor Q value (1000 or more) in the high-frequency region (2 GHz), and a good temperature property (|Tcc|≤30 ppm/° C.), although this sample is a thin film having a thickness of 400 nm.

In addition, from FIG. 2, each sample judged to have a mixed phase of the crystal phase and the amorphous phase based on the half-value width was visually confirmed by TEM observation that the complex oxide had a mixed phase of the crystal phase and the amorphous phase.

Furthermore, it was confirmed that by limiting the Zn content proportion ("y"), a high relative permittivity εr and a high quality factor Q value are maintained, and a good temperature property (|Tcc|≤15 ppm/° C.) is provided.

In addition, it was confirmed that by increasing "x/z", that is, by increasing the content proportion of Bi, a high quality factor Q value, and a good temperature property is maintained, and a higher relative permittivity εr (120 or more) is obtained.

In addition, it was confirmed that by making "x/z" close to 1, that is, by making the content proportion of Bi and the content proportion of Nb substantially the same, a high relative permittivity εr and a good temperature property are maintained, and a higher high quality factor Q value (1500 or more) is obtained.

According to the present invention, a dielectric composition having a high relative permittivity and a Q value in a high-frequency region and a small temperature coefficient of capacitance in a predetermined temperature range can be obtained. Such a dielectric composition is suitable as a thin film-shaped dielectric film, and is suitable for high-frequency electronic components such as a balun, a coupler, a filter, or a duplexer and a diplexer combined with a filter.

10 Thin film capacitor
1 Substrate
2 Foundation layer
3 Lower electrode
4 Upper electrode
5 Dielectric film

What is claimed is:

1. A dielectric composition comprising a complex oxide containing bismuth, zinc, and niobium, wherein
dielectric composition comprises a crystal phase formed of the complex oxide and having a pyrochlore type crystal structure, and an amorphous phase, and
the complex oxide is represented by a composition formula $Bi_xZn_yNb_zO_{1.75+\delta}$, in which x, y, and z satisfy relations of x+y+z=1.00, 0.20≤y≤0.50, and 2/3≤x/z≤3/2.

2. The dielectric composition according to claim 1, wherein
the amorphous phase has the same composition as the complex oxide.

3. A dielectric composition comprising a complex oxide containing bismuth, zinc, and niobium, wherein
the complex oxide is represented by a composition formula $Bi_xZn_yNb_zO_{1.75+\delta}$, in which x, y, and z satisfy relations of x+y+z=1.00, 0.20≤y≤0.50, and 2/3≤x/z≤3/2, and
in an X-ray diffraction chart of the dielectric composition obtained by an X-ray diffraction measurement using a Cu—Kα ray as an X-ray source, a half-value width of a diffraction peak of a (222) plane that appears in a range of a diffraction angle 2θ of 27° or more and 30° or less is 0.35° or more and 2.0° or less.

4. The dielectric composition according to claim 3, wherein
the dielectric composition comprises a crystal phase having a pyrochlore type crystal structure, and an amorphous phase.

5. The dielectric composition according to claim 1, wherein
satisfies a relation of 0.30≤y≤0.50.

6. The dielectric composition according to claim 3, wherein
y satisfies a relation of 0.30≤y≤0.50.

7. The dielectric composition according to claim 1, wherein
x and z satisfy a relation of 1.20≤x/z≤1.50.

8. The dielectric composition according to claim 3, wherein
x and z satisfy a relation of 1.20≤x/z≤1.50.

9. The dielectric composition according to claim 1, wherein
x and z satisfy a relation of 0.90≤x/z≤1.10.

10. The dielectric composition according to claim 3, wherein
x and z satisfy a relation of 0.90≤x/z≤1.10.

11. An electronic component comprising a dielectric film containing the dielectric composition according to claim 1.

12. An electronic component comprising a dielectric film containing the dielectric composition according to claim 3.

13. The electronic component according to claim 11, wherein
the dielectric film is a dielectric deposition film.

14. The electronic component according to claim 12, wherein
the dielectric film is a dielectric deposition film.

* * * * *